June 30, 1953
G. W. ASHLOCK, JR
2,643,694
MACHINE FOR STUFFING OLIVES
Filed May 31, 1949
4 Sheets-Sheet 1
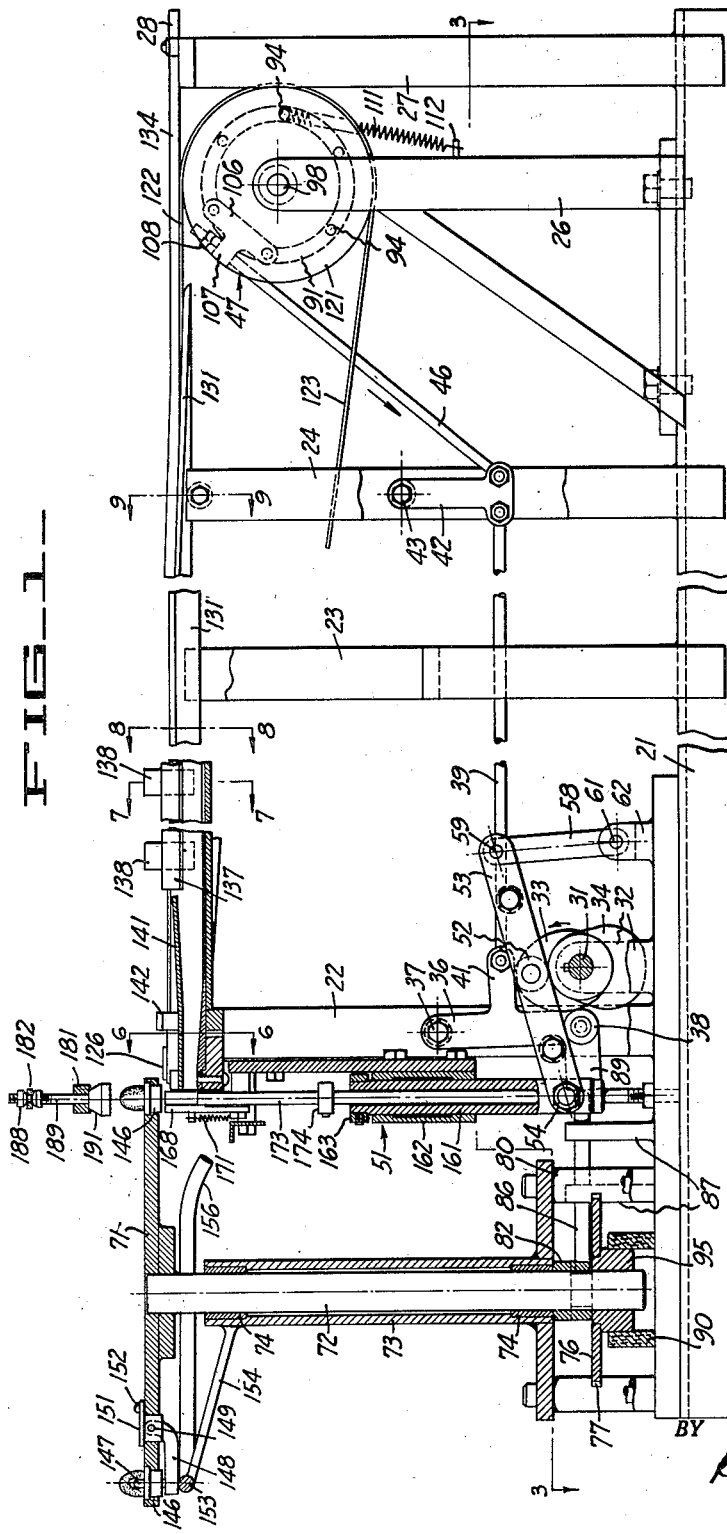
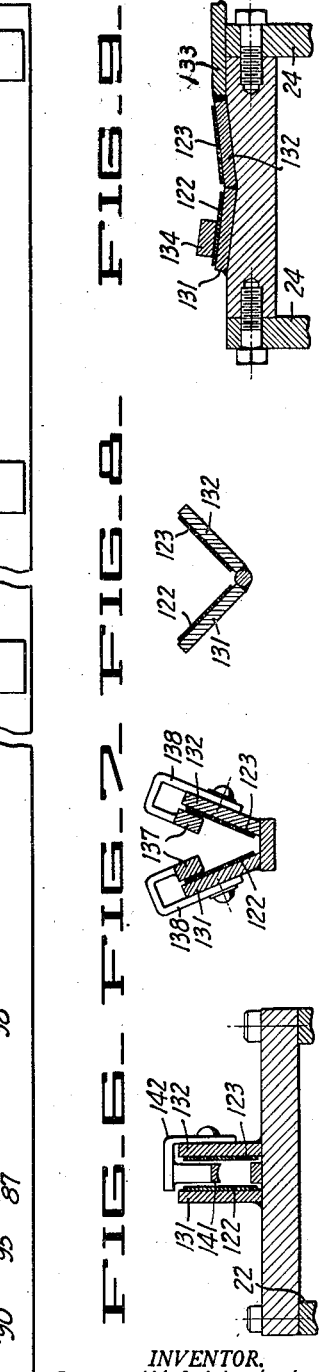
INVENTOR.
George W. Ashlock, Jr.
BY
ATTORNEY

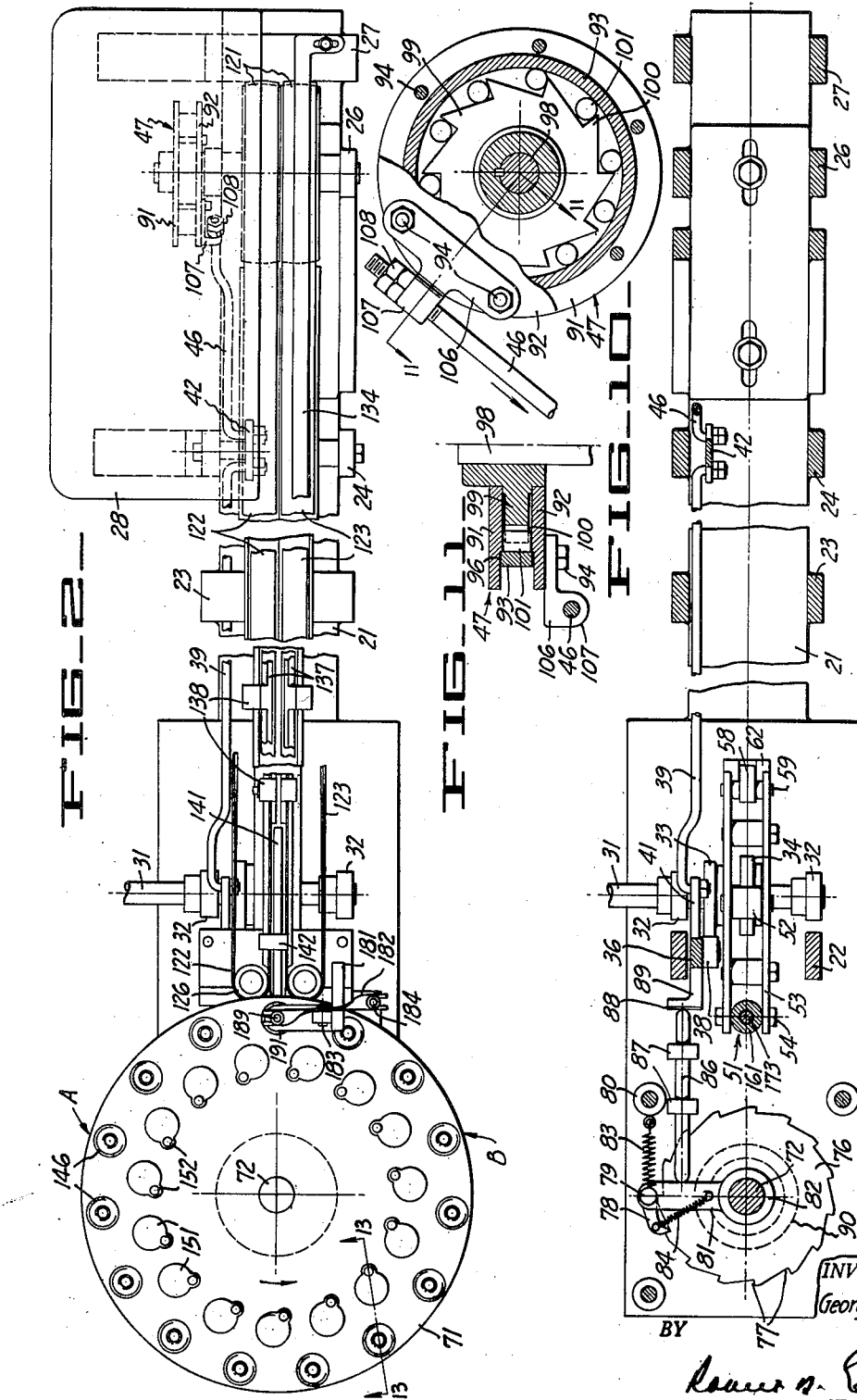

June 30, 1953 G. W. ASHLOCK, JR 2,643,694
MACHINE FOR STUFFING OLIVES
Filed May 31, 1949 4 Sheets-Sheet 3
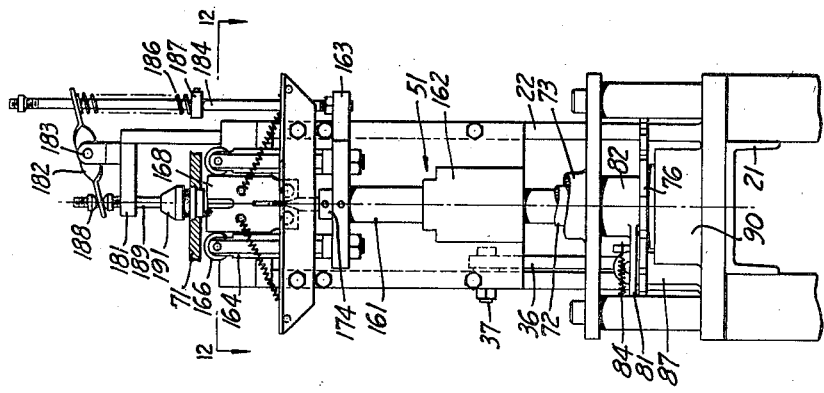
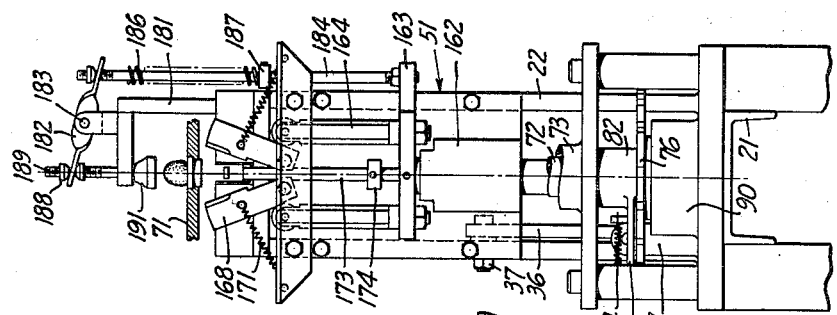
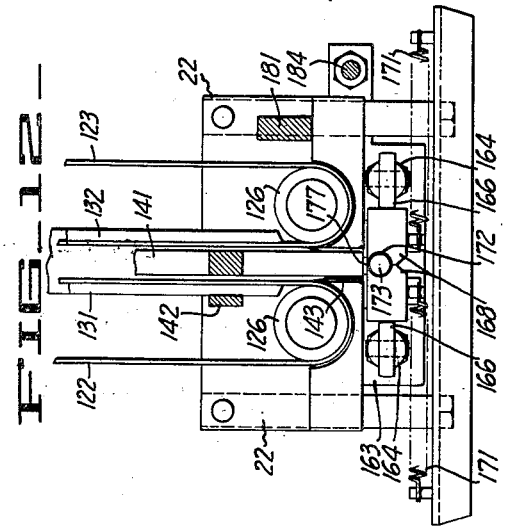
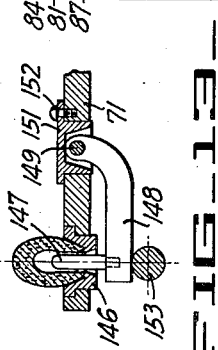
INVENTOR.
George W. Ashlock, Jr.
BY
ATTORNEY

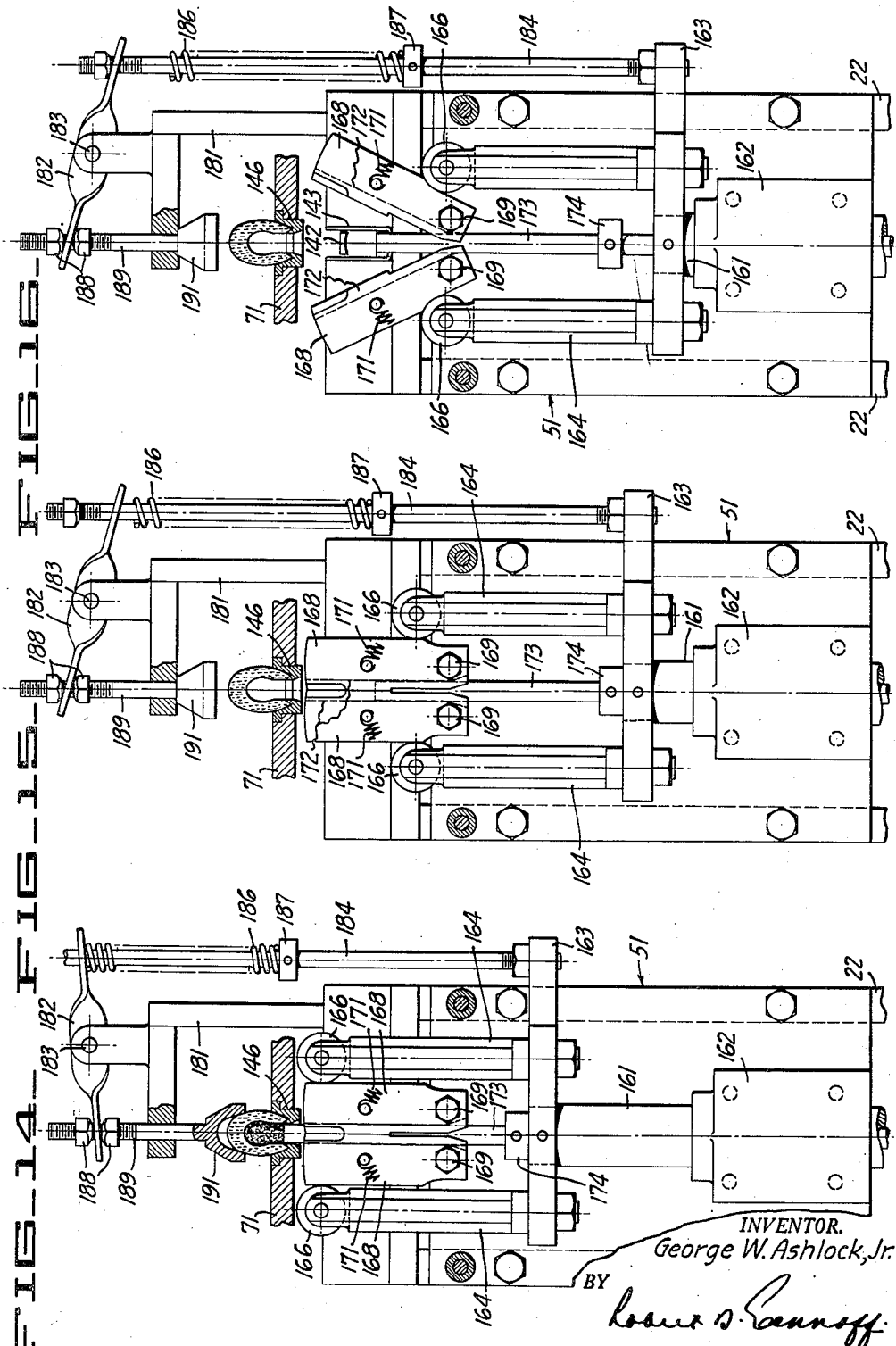

Patented June 30, 1953

2,643,694

UNITED STATES PATENT OFFICE 2,643,694

MACHINE FOR STUFFING OLIVES

George W. Ashlock, Jr., Oakland, Calif.

Application May 31, 1949, Serial No. 96,324

18 Claims. (Cl. 146—27)

This invention relates to a novel machine for placing a stuffing material such as pimento in an article such as an olive.

The invention will be described as it has been successfully applied to the formation of a stuffing of pimento and the placing of this in a previously stoned olive. However, it is to be understood that the invention is not limited to the handling of pimento or to the stuffing of olive and that the machine can be applied to the formation and to the placement of other stuffing material such as onions, nuts and the like, and to the placement of a stuffing material in a prepared fruit or other object, such as a prune, date, cherry or the like.

The stuffing of olives with pimento has heretofore been carried on by hand. Necessarily, the operation is slow and time-consuming and, as a consequence, these articles are relatively expensive. In accordance with the present invention, I provide a novel machine which can be utilized successfully to place a stuffing material, such as pimento, in a previously prepared fruit, such as a stoned olive.

It is in general the broad object of the present invention to provide a novel machine for the placement of a stuffing material in a prepared object such as an olive.

The invention includes other objects and features of advantage, some of which, together with the foregoing, will appear hereinafter wherein the present preferred form of machine for practicing the invention will be disclosed.

In the drawings accompanying and forming a part hereof,

Figure 1 is a side elevation of a complete machine embodying the present invention.

Figure 2 is a plan view of the machine shown in Figure 1.

Figure 3 is a section taken along the line 3—3 in Figure 1.

Figure 4 is a front view of the machine showing a portion of the plug-forming mechanism in position just prior to formation of a plug of a stuffing material.

Figure 5 is a view similar to Figure 4, but showing the parts in the position which they occupy during placement of the stuffing material in the prepared fruit.

Figure 6 is a section along the line 6—6 of Figure 1.

Figures 7, 8 and 9 are respectively sections taken along the lines 7—7, 8—8 and 9—9 in Figure 1 and showing the relation of the belts utilized to convey the stuffing material toward the object stuffing station.

Figure 10 is a side elevation partly in section through a portion of the drive mechanism.

Figure 11 is a section taken along the line 11—11 in Figure 10.

Figure 12 is a view taken along the line 12—12 in Figure 5.

Figure 13 is a view along the line 13—13 of Figure 2.

Figures 14, 15 and 16 are operational views illustrating the relation of the various parts during formation of the charge of the stuffing material and its placement in the prepared fruit.

Frame

The machine includes a suitable frame structure comprising a base 21 having a plurality of vertical members 22, 23, 24, 26 and 27 secured thereto and extending vertically to support a horizontal table 28.

The drive

To supply power to the machine and to operate the various mechanisms thereof in a timed relationship, means are provided for driving the various mechanism including power input shaft 31 suitably journalled on uprights 32 secured to the base 21. Mounted upon shaft 31 for rotation therewith are cams 33 and 34. A bell crank 36 is hinged upon frame as at 37, the bell crank having a cam follower 38 thereon engaged with cam 33. A rod 39 extends from an arm 41 on the bell crank 36 to a lever 42 hinged as at 43 upon upright 24. Another rod 46 is extended from lever 42 to the clutch mechanism, generally indicated at 47 and to be presently described in detail.

Mechanism for moving stuffing material into a positioned object is generally indicated at 51 and being reciprocated with respect to frame 22 upon which it is mounted, as will be presently described in detail. To provide the necessary reciprocating motion, a cam follower 52 is mounted in a box-frame 53 hinged to the stuffing mechanism 51 as at 54, the box-frame also being hinged as at 59 upon a lever 58 which is in turn hinged as at 61 upon a standard 62 mounted upon the base 21.

The machine also includes means for advancing a continuous supply of articles to be stuffed. In the form of the device shown in the drawing, this is provided by a circular table 71 mounted for rotation with a shaft 72, which is vertically positioned in a standard or column structure 73 in which are provided bearings 74. A circular rachet plate 76 is mounted upon the shaft 72, the plate having a plurality of teeth 77 provided about its periphery. A pawl 78 is hinged as at 79 upon an arm 81 extending from a collar 82 fitting rotatably on shaft 72. A spring 83 extends from the arm 81 to upright 80. Another spring 84 extends from the arm 81 to pawl 78 to retain the pawl in engagement with the ratchet plate. A rod 86 is slidably mounted in standards 87 on the base 21, the rod being held in engagement by spring 83 with the arm 81 and with a foot 88 provided upon an extension 89 on the bell crank 36 so that movement of the circular table 71 is coordinated with other operations of the machine. A brake band 90 is secured to the base 21 and surrounds a braking element 95 on the shaft 72 to provided a drag on the shaft whereby the latter stops its rotation immediately the pawl ceases its rotational movement. This ensures that the table moves through the same arc upon each movement of the pawl.

Clutch mechanism

The clutch mechanism 47 includes two annular plates 91 and 92 spaced apart by an outer annular ring 93, the plates and the ring being secured together by bolts 94 and the ring fitting in position between the plates against an annular shoulder 96 formed upon each plate. Plates 91 and 92 are mounted for rotation about a hub structure including an annular plate portion 99 having a plurality of angularly formed teeth 100 thereon extending outwardly and closely adjacent to the ring 93. A roller 101 is interposed in the space between each tooth and the ring 93, one or more of the rollers jamming between the driven outer ring 93 and the annular plate 99 to impart definite positive drive to the shaft 98. Plate 92 carries an extension 106 thereon having an upstanding ear 107 through which rod 46 extends slidably.

The degree of rotational movement imparted to shaft 98 by the clutch mechanism 47 is regulated by adjusting nuts 108 on the end of rod 46 to space these from the ear 107. One of the bolts 94 butts against frame member 26 under the bias of spring 111, the spring being extended between an extension 112 on a frame member 26 and another one of the bolts 94, as appears in Figure 1. To vary the extent of motion imparted upon reciprocation of rod 46, the position of nuts 108 on rod 46 is varied. This permits the rod to move upwardly to any desired extent so that the rod can be reciprocated with a constant length stroke. However, when the rod is moved downwardly and in the direction of the arrow in Figures 1 and 10, the nuts are brought into engagement with the ear 107 and the clutch is rotated in a counter-clockwise direction to rotate shaft 98 in a counter-clockwise direction and spring 111 is lengthened. As soon as rod 46 reaches the end of its stroke, it starts its return movement, spring 111 rotating the clutch device in a clockwise direction until bolt 94 strikes against the frame member 26. Any desired extent of lost motion and, in turn, of rotation of clutch 47, can be provided between the rod 46 and the clutch 47 by adjusting nuts 108 with respect to ear 107. In this manner, the stuffing material can be fed step-wise and in a desired degree of advance.

The pimento feeding mechanism

Means are provided for feeding pimento. As is well known, pimento is a relatively tough material which occurs, as prepared, in pieces of an irregular shape and size. Shaft 98 carries two spaced wheels 121 thereon rotatable about a horizontal axis and about which are provided belts 122 and 123, the belts being positioned horizontally at one end of the machine (right hand end, Figure 1) and extending forwardly to pass about wheels 126 at the forward end of the machine, the wheels 126 being positioned for rotation about a vertical axis. Between the horizontal position of the belts as they pass about wheels 121 and the vertical position about wheels 126, the belts move through a continually changing relationship such that they advance gradually toward one another, being supported in this by guide plates 131 and 132, supporting respectively belts 122 and 123; the pimento is fed upon the belts from shelf 133 (Figure 9) and into abutment with a guide plate 134. As the belts advance toward one another, the pimento is gradually caused to be folded upon itself. To assist the pimento in this and to insure that it is formed into a compact, folded mass, a guide 137 is provided which, with guide 134, is mounted upon adjustable brackets 138, secured to the guide plates 131 and 132. Immediately ahead of the wheels 126, a guide plate 141 is interposed between the belts, being adjustably mounted upon plate 132 by bracket 142, to force the pimento downwardly into a compact mass and into the U-shaped guide and stuffing charge forming pocket 143 and which is shown in place in Figure 12. The pocket 143 guides the pimento on after it has left the belts and delivers it in position for stuffing.

The article positioning means

Table 71 includes a plurality of receptacles 146 thereon; when olives are to be stuffed, each receptacle can have a configuration such as is taught in my prior Patent No. 2,250,518 wherein each receptacle has the internal shape of a truncated cone with an included angle between 32° and 42°. The articles to be stuffed may be placed in each receptacle by hand or by any suitable feeding mechanism. To assist in positioning an article for stuffing, I provide a locating pin 147 carried upon arm 148, the latter being hinged as at 149 upon a removable member 151, secured by screw 152 to the plate 71. The presence of the pins is, of course, undesirable during the stuffing operation and each pin is accordingly moved into and out of its associated cavity by a suitable track 153 mounted upon arms 154 from the standard 73. The track extends arcuately downwardly at each end 156, as appears in Figure 1 and the pins are normally presented in an article supporting position between points A and B during the counter-clockwise rotation of the table in Figure 2.

The stuffing mechanism

The stuffing mechanism 51 includes a hollow plunger 161 movable upwardly in a suitable supporting structure 162 mounted upon vertical frame member 22. The plunger 161 carries a transverse cross member 163 having two vertically extending arms 164 thereon, each carrying a roller 166. Hinged upon the vertical frame member 162 at 169 are a pair of filling material forming members 168 biased by springs 171 into an open position, namely that in which these members appear in Figure 16. Each of the members includes a semi-cylindrical cavity 172 therein through which a plunger 173 is reciprocated, the latter being mounted for sliding in the hollow plunger 161 and in the charge guide pocket 143; the normal position of the plunger is as is shown in Figure 4 wherein the plunger 173 is in such position that collar 174 thereon is above the cross member 163 and the lower end of the plunger rests on base 21. As the cross member is raised, wheels 166 move the charge forming members 168 from that position in which they appear in Figure 15 and wherein the members are closed. When collar 174 is engaged by the cross member 163, the continued upward movement of the cross member is effective to force the plunger through the charge forming members to eject the charge of stuffing material. That portion of each semi-cylindrical cavity 172 defining the inner longitudinal edges of the charge forming members 168 and adjacent to the belts 122 and 123 is provided with a knife edge 177 to sever the charge in the cavity from that which is fed into the cavity.

*Retention during stuffing*

To retain an article in position during placement of the charge, frame member 22 includes an extension 181 thereon having a lever 182 hinged as at 183. A rod 184 extends upwardly from the cross member 163 and a spring 186 is extended between a collar 187 on the rod 184 and that end of lever 182 which fits over the rod 184. The other end of lever 182 is mounted between nuts 188 carried upon a rod 189, the latter being reciprocably mounted in extension 181 and carrying a cup 191 on the end thereof. As the cross member is raised, cup 191 is lowered into position to retain an article.

*Operation*

With the shaft 31 being rotated by a suitable prime mover, rod 46 is reciprocated to impart a stepwise movement to belts 122 and 123. An operator places a strip of pimento upon the belts so that, as the belts advance from the loading station at the right hand side of Figure 1 to the charge forming and stuffing station adjacent the left hand side of Figure 1, the stuffing material is gradually folded upon itself and compacted into a charge of material. This is particularly desirable in the handling of pimento inasmuch as the inner surface of pimento is rough and uneven while the other side is smooth and glossy. By folding the material upon itself, the smooth, glossy and attractive surface of the material is placed outermost so that the pimento slips easily into an article into which it is to be stuffed, presenting a more pleasing appearance and handling far more readily.

As an operator places articles to be stuffed, such as olive, in the several receptacles and upon the projecting pins 147, the table 71 is advanced toward and into the stuffing position wherein the pins are out of the way. As each article is received, a charge of the material is cut off from that in the charge forming or guide pocket 143 by the knife edges 177 on members 168 as these are forced together, the charge is compressed and formed into a plug of desired shape; with a semi-cylindrical cavity in each of the charge forming members 168, a cylindrical plug is formed. Of course, the charge formed can be of any desired cross sectional shape by varying the cavity in each of the charging members.

The articles to be stuffed are held in position by cup 191 and the plunger 173 forces the charge into position. The table 71 is advanced stepwise and in time with the stepwise advance of the charge forming material and its cut-off and formation from the continuous supply on the belts. After an article has been stuffed, the pin associated with the receptacle is returned to its article receiving position by engagement with the cam track 153. If the article has been stuffed, the article is knocked off the table by the return of the pin 147 into the cavity so that the operator knows the placement of an unstuffed article is required, the stuffed articles being collected.

From the foregoing, I believe it will be apparent that I have provided a novel, simple form of machine for the placement of stuffing material in olives, cherries and the like.

I claim:

1. A machine for stuffing olives and the like comprising a pair of flat belts each having a carrying surface thereon; means for moving the belts over a path between a feeding station, whereat the carrying surfaces on the belts are substantially horizontal and in a side by side relation in a common plane, and a stuffing station, whereat the carrying surfaces on the belts are in a vertical plane and substantially parallel to one another and spaced apart only the width of a folded strip of stuffing material which is carried by the belts, means for advancing the belts toward the stuffing station to advance a strip of material to said station and project a portion of said strip beyond said belts; means for cutting a plug from that portion of the folded strip projected beyond said belts; means for positioning a fruit having a cavity therein in a position to receive said cut plug; and means for inserting the cut plug into the cavity in the positioned fruit.

2. A machine for stuffing olives and the like comprising a pair of flat belts each having a carrying surface thereon; means for moving the belts over a path between a feeding station, whereat the carrying surfaces on the belts are substantially horizontal and in a side by side relation in a common plane, and a stuffing station, whereat the belts are substantially parallel to one another and in a vertical plane and spaced apart only the width of a folded strip of stuffing material which is carried by the belts and a portion of the strip is projected beyond the belts; means for cutting a plug from the folded strip at the stuffing station, including a pair of hinged jaws movable toward one another to cut a length from the projected portion of said strip and form the same into a plug of a desired cross-section; means for positioning a fruit having a cavity in a position to receive said plug; and means for inserting the cut plug from between the jaws into the cavity in the positioned fruit.

3. A machine for stuffing olives and the like comprising a pair of flat belts each having a carrying surface thereon; means for moving the belts over a path between a feeding station whereat the carrying surfaces on the belts are substantially horizontal and in a side by side relation in a common plane and a stuffing station whereat the carrying surfaces on the belts are vertical and substantially parallel to one another and spaced apart only the width of a folded strip of stuffing material which is carried by the belts, means for simultaneously cutting a length from the folded strip and forming it into a plug, means for positioning a fruit having a cavity in a position to receive said plug including a fruit conveyor movable over a path including a fruit loading station and said stuffing station, said conveyor including a plurality of fruit receptacles and a plurality of pins, each pin being movable into and out of a cooperatively associated and positioned receptacle, and means for inserting a preformed plug into a positioned fruit at said stuffing station.

4. A machine for stuffing olives and the like comprising a pair of flat belts each having a carrying surface thereon, means for moving the belts over a path between a feeding station whereat the carrying surfaces on the belts are substantially horizontal and in a side by side relation in a common plane and a stuffing station whereat the carrying surfaces on the belts are vertical and substantially parallel to one another and spaced apart only the width of a folded strip of stuffing material which is carried by the belts, means for simultaneously cutting a length from the folded strip and forming it into a plug, means for positioning a fruit having a cavity in a position to receive said cut plug including a fruit conveyor movable over a path including a fruit loading station and said stuffing station, said conveyor including a plurality of fruit receptacles and a pin associated cooperatively with each receptacle and movable into and out of each cooperatively positioned receptacle, means for moving each pin to project through and past an associated receptacle during traverse of said conveyor toward, through and past said loading station and for retracting each pin as its cooperatively associated receptacle approaches said stuffing station and for projecting each pin as the conveyor moves away from the loading station to eject a stuffed fruit, and means for inserting the cut plug into a positioned fruit at said stuffing station.

5. A machine for stuffing olives and the like comprising means for feeding continuously a strip of a stuffing material toward a stuffing station, means for folding the strip during feeding upon itself and into a U-shape, means for cutting a length from the folded strip at said stuffing station, means operable simultaneously with said cutting means to form the cut length into a plug, and means for positioning a fruit having a cavity therein in position at said stuffing station to receive said cut plug including a fruit conveyor movable over a path including a fruit loading station and said stuffing station, said conveyor including a plurality of fruit receptacles and a pin movable into and out of each cooperatively positioned receptacle, and means for inserting the preformed cut plug into a positioned fruit.

6. A machine for stuffing olives and the like comprising means for continuously feeding a strip of a stuffing material toward a stuffing station, means for folding the strip during feeding upon itself and into a U-shape, means for cutting a length from the folded strip at the stuffing station, means operable simultaneously with said cutting means to form it into a plug, means for positioning a fruit having a cavity therein in position at said stuffing station to receive said cut plug including a fruit conveyor movable over a path including a fruit loading station and said stuffing station, said conveyor including a plurality of fruit receptacles and a pin movable into and out of each cooperatively positioned receptacle, means for moving each pin to project from said receptacle during traverse of said conveyor toward, through and past said loading station and for retracting each pin as its cooperatively associated receptacle approaches said stuffing station and for projecting each pin as the conveyor moves away from the loading station to eject a stuffed fruit, and means for inserting the cut plug into the cavity in a positioned fruit.

7. A machine for stuffing olives and the like comprising a pair of flat belts each having a carrying surface thereon, the belts being movable over a path between a feeding station whereat the carrying surfaces on the belts are substantially horizontal and in a side by side relation in a common plane and a stuffing station whereat the carrying surfaces on the belts are substantially vertical and parallel to one another and spaced apart only the width of a folded strip of stuffing material which is carried by the belts, means for advancing the belts toward the stuffing station, means for simultaneously cutting a length from the folded strip at the stuffing station and forming it into a plug, means for positioning a fruit having a cavity in a position at said stuffing station to receive said cut plug including a fruit conveyor movable over a path including a fruit loading station and said stuffing station, said conveyor including a plurality of fruit receptacles and a pin movable into and out of each cooperatively positioned receptacle, and means for inserting the cut plug into the cavity in the positioned fruit.

8. A machine for stuffing olives and the like comprising a pair of flat belts each having a carrying surface thereon, means for moving the belts over a path between a feeding station whereat the carrying surfaces on the belts are substantially horizontal and in a side by side relation in a common plane and a stuffing station whereat the carrying surfaces on the belts are substantially vertical and parallel to one another and spaced apart only the width of a folded strip of stuffing material which is carried by the belts, means for advancing the belts toward the stuffing station, means for simultaneously cutting a length from the folded strip and forming it into a plug, means for positioning a fruit having a cavity in a position to receive said plug including a fruit conveyor movable over a path including a fruit loading station and said stuffing station, said conveyor including a plurality of fruit receptacles and a pin movable into and out of each cooperatively positioned receptacle, means for moving each pin to project from said receptacle during traverse of said conveyor toward, through and past said loading station and for retracting each pin as its cooperatively associated receptacle approaches said stuffing station and for projecting each pin as the conveyor moves away from the loading station to eject a stuffed fruit, and means for inserting the cut plug into the cavity in the positioned fruit.

9. In a machine for stuffing olives and the like comprising a pair of flat belts each having a carrying surface thereon, the belts being movable over a path between a stuffing material feeding station whereat the carrying surfaces on the belts are substantially horizontal and in a side by side relation in a common plane and a stuffing station, whereat the belts are substantially vertical and parallel to one another and spaced apart only the width of a folded strip of stuffing material which is carried by the belts, means for advancing the belts step-wise from the folding station to the stuffing station to project a predetermined length of stuffing material in advance of the belts and to the stuffing station at each step-wise advance, a plurality of jaw-cutters at said stuffing station for simultaneously cutting off the projected predetermined length of material fed to said station at each stepwise advance and forming the same into a plug, and means for operating said jaw-cutters to cut off the material and form the plug following each step-wise advance of the belts.

10. In a machine for stuffing olives and the like comprising a pair of flat belts each having a carrying surface thereon, the belts being movable over a path between a feeding station, whereat the carrying surfaces on the belts are substantially horizontal and in a side by side relation in a common plane, and a stuffing station, whereat the carrying surfaces on the belts are substantially vertical and parallel to one another and spaced apart only the width of a folded strip of stuffing material which is carried by the belts, means for advancing the belts step-wise toward the stuffing station to fold a strip of material upon itself and into a U-shape as the belts advance toward the stuffing station, a plurality of jaw-cutters at said stuffing station for simultaneously cutting off the predetermined length of U-shaped material fed to such station after each step-wise advance and forming the same into a plug, and means for operating said jaw-cutters to cut off the material and form the plug following each step-wise advance of the belts.

11. A machine for stuffing olives and the like comprising a pair of flat belts each having a carrying surface thereon, the belts being movable over a path between a feeding station, whereat the carrying surfaces on the belts are substantially horizontal and in a side by side relation in a common plane, and a stuffing station whereat the carrying surfaces on the belts are substantially vertical and parallel to one another and spaced apart only the width of a folded strip of stuffing material which is carried by the belts, means for advancing the belts toward the stuffing station, means for simultaneously cutting a length from the folded strip at the stuffing station and forming it into a plug, including a pair of hinged jaws movable toward one another first to cut a plug from said strip and then form the same into a plug of a desired cross-section, means for positioning a fruit having a cavity in a position to receive said plug, and means for forcing the cut plug from between the jaws into the positioned fruit including a plunger for forcing a plug from between said jaws and into the cavity in the fruit.

12. A machine for stuffing olives and the like comprising a pair of flat belts each having a carrying surface thereon, the belts being movable over a path between a feeding station, whereat the carrying surfaces on the belts are substantially horizontal and in a side by side relation in a common plane, and a stuffing station, whereat the carrying surfaces on the belts are substantially vertical and parallel to one another and spaced apart only the width of a folded strip of stuffing material which is carried by the belts, means for advancing the belts toward the stuffing station to project a length of the material in advance of said belts, a pair of jaws movable simultaneously to cut said length of material and form it into a plug, means for positioning a fruit having a cavity in a position to receive said plug including a fruit conveyor movable over a path including a fruit loading station and said stuffing station, said conveyor including a plurality of fruit receptacles and a pin movable into and out of each cooperatively positioned receptacle, means for moving each pin to project from said receptacle during traverse of said conveyor toward, through and past said loading station and for retracting each pin as its cooperatively associated receptacle approaches said stuffing station and for projecting each pin as the conveyor moves away from the loading station to eject a stuffed fruit, and means for inserting the cut plug into the positioned fruit at said stuffing station, including a plunger for forcing a plug from between said jaws and into a cavity in a fruit.

13. A machine for stuffing olives and the like comprising a pair of flat belts each having a carrying surface thereon, the belts being movable over a path between a feeding station, whereat the carrying surfaces on the belts are substantially horizontal and in a side by side relation in a common plane, and a stuffing station, whereat the carrying surfaces on the belts are substantially vertical and parallel to one another and spaced apart only the width of a folded strip of stuffing material which is carried by the belts, means for advancing the belts toward the stuffing station, a pair of jaws positioned on each side of and in advance of the belts to receive a strip of material advanced by the belts, said jaws each having a cavity therein, means for moving the jaws first to sever material from the strip and then to compress the severed material into a plug in the jaw cavities wherein the so-formed plug of the severed strip of material is retained, and a plunger movable between said jaws to eject said plug from between the jaws.

14. A machine for stuffing olives and the like comprising means for feeding continuously a strip of a stuffing material toward a stuffing station, means for cutting a length from the strip at said stuffing station, means operable simultaneously with said cutting means to form the cut length into a plug, means for positioning a fruit having a cavity therein in position at said stuffing station to receive said cut plug including a fruit conveyor movable over a path including a fruit loading station and said stuffing station, said conveyor including a plurality of fruit receptacles and a pin movable into and out of each cooperatively positioned receptacle, and means for inserting the preformed cut plug into a positioned fruit.

15. A machine for stuffing olives and the like comprising means for feeding a series of sheets of pimento in an end-to-end coplanar relationship to provide a functionally continuous strip of a stuffing material moving toward a stuffing station, said feeding means having means for folding the strip upon itself and into a U-shape, said folding being on a line at the center of the strip and parallel to the direction of movement and during the movement of the strip, said feeding means advancing a portion of the folded strip beyond the feeding means while the remainder of the strip is held in folded position by the feeding means, means for severing that portion of the folded U-shaped strip at the stuffing station which projects beyond the feeding means while the remainder of the strip is retained by the feeding means, means for forming said folded portion into a plug of generally circular transverse section simultaneously with the severing of said portion, means for positioning a fruit having a cavity therein in position to receive said plug at said stuffing station, and means for inserting the plug into the cavity in the positioned fruit at said stuffing station.

16. A machine for stuffing olives and the like comprising means for feeding a series of sheets of pimento in an end-to-end coplanar relationship to provide a functionally continuous strip of a stuffing material moving toward a stuffing station, said feeding means having means connected therewith for folding the strip upon itself and into a U-shape, said folding being on a line at the center of the strip and parallel to the direction of movement and during the movement of the strip, said feeding means advancing a portion of the folded strip beyond the feeding means while the remainder of the strip is held in folded position by the feeding means, means for severing that portion of the folded U-shaped strip at the stuffing station which projects beyond the feeding means while the remainder of the strip is retained by the feeding means, means for forming said folded portion into a plug of generally circular transverse section simultaneously with the severing of said portion, means for positioning a fruit having a cavity therein in position to receive said plug at said stuffing station, and means for inserting the plug into the cavity in the positioned fruit at said stuffing station.

17. A machine for stuffing olives and the like comprising means for feeding a substantially continuous functionally unitary planar strip of a stuffing material moving toward a stuffing station, said feeding means having means for folding the strip upon itself and into a U-shape, said folding being on a line at the center of the strip and parallel to the direction of movement and during the movement of the strip, said feeding means advancing a portion of the folded strip beyond the feeding means while the remainder of the strip is held in folded position by the feeding means, means for severing that portion of the folded U-shaped strip at the stuffing station which projects beyond the feeding means while the remainder of the strip is retained by the feeding means, means for forming said folded portion into a plug of generally circular transverse section simultaneously with the severing of said portion, means for positioning a fruit having a cavity therein in position to receive said plug at said stuffing station, and means for inserting the plug into the cavity in the positioned fruit at said stuffing station.

18. A machine for stuffing olives and the like comprising means for feeding a series of sheets of pimento in an end-to-end coplanar relationship to provide a functionally continuous strip of a stuffing material moving toward a stuffing station, said feeding means having connected therewith means for folding the strip upon itself and into a U-shape, said folding being on a line at the center of the strip and parallel to the direction of movement and during the movement of the strip, said feeding means advancing a portion of the folded strip beyond the feeding means while the remainder of the strip is held in folded position by the feeding means, means at said stuffing station for simultaneously cutting off a length of said projected U-shaped strip and forming the cut length into a plug, said means including a pair of jaws movable toward one another to cut a length of said strip and form the same into a plug of a generally circular cross section, means for positioning a fruit having a cavity therein into a position at said stuffing station to receive said cut plug, and means for moving the cut plug from between the jaws and into the cavity in said positioned fruit at said stuffing station.

GEORGE W. ASHLOCK, Jr.

References Cited in the file of this patent

UNITED STATES PATENTS

| Number | Name | Date |
|---|---|---|
| 667,423 | Brown | Feb. 5, 1901 |
| 716,331 | Brown | Dec. 16, 1902 |
| 749,697 | Middlekauff et al. | Jan. 12, 1904 |
| 1,133,054 | Newcomb | Mar. 23, 1915 |
| 1,365,129 | Thornton | Jan. 11, 1921 |
| 1,502,929 | Tuttle | July 29, 1924 |
| 2,293,133 | Halferty | Aug. 18, 1942 |
| 2,343,521 | Benning | Mar. 7, 1944 |
| 2,351,788 | Smith | June 20, 1944 |
| 2,384,429 | Ball | Sept. 11, 1945 |
| 2,597,933 | Hungate | May 27, 1952 |